Figure 1:
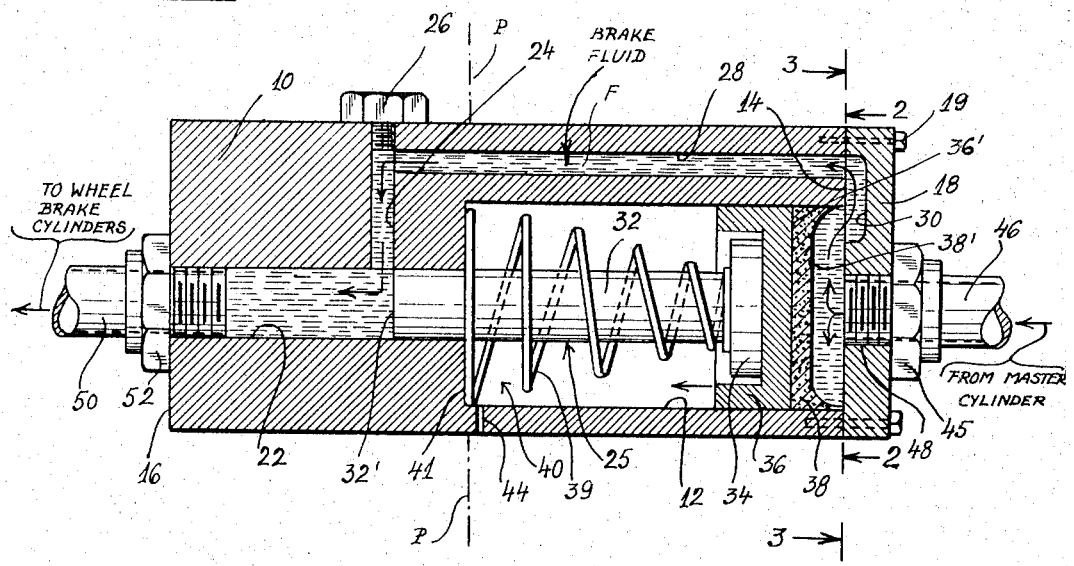

Jan. 2, 1968   H. E. PEREZ   3,360,937
HYDRAULIC BRAKE BOOSTER
Filed Dec. 3, 1965

INVENTOR
Horacio E. Perez
BY Polachek & Saulsbury
ATTORNEYS

United States Patent Office 3,360,937
Patented Jan. 2, 1968

3,360,937
HYDRAULIC BRAKE BOOSTER
Horacio E. Perez, 612 Lake Elizabeth Drive,
Winter Haven, Fla. 33880
Filed Dec. 3, 1965, Ser. No. 511,535
10 Claims. (Cl. 60—54.5)

This invention relates to a hydraulic brake booster, and more particularly concerns a device which will increase the braking effect of pressure applied to the brake pedal of a hydrualic brake system without requiring extra braking effort, longer pedal travel or power assist.

The device is small, compact, inexpensive to manufacture. It can be used without basic modification with all types of hydraulic brakes, and in vehicles of different weights, thus eliminating the need for power assist in a hydraulic brake system. The invention is embodied in relatively simple booster device so arranged that the brake pedal travel will be the same or less than in conventional hydraulic brakes. The invention permits the brakes to be set with the usual amount of pedal travel before activating the booster and then the pedal pressure is greatly increased by the action of the booster without additional brake pedal travel. The invention affords the advantages of power brakes without the disadvantages of complexity and high cost of manufacture, installation and servicing characteristic of conventional power brakes. The booster according to the invention, can be made up as a small, compact unit for installation as an accessory in any conventional hydraulic brake system. No particular skill is required for installation and no special tools are required.

The invention has the following important objects among others:

First, to provide a device which will greatly increase the pressure applied to the brakes of a vehicle without the obvious disadvantage of longer brake pedal travel.

Second, to provide a device which will be independent of the motor of the vehicle and yet afford the convenience and ease of operation obtained with power brakes.

Third, to provide a device which can be installed in any existing vehicle by a simple connection to the brake system of the vehicle.

Fourth, to provide a device which is inexpensive and simple to manufacture while still providing an efficient brake booster that assures trouble-free operation and ease of maintenance.

Fifth, to provide a device capable of incorporation in a new vehicle or installation in a vehicle already in use, without requiring modification thereof, the device constituting an accessory or attachment.

Sixth, to provide a device operative effectively as power assisted brakes without the bulk, costly components, and failure hazards inherent in power brake systems.

Seventh, to provide a brake booster which can be used to advantage with disc brakes and with any two brake-systems arrangement; which is failure-proof; which is small, compact, and simple in design; and which provides sufficient power to brake heavy vehicle and loads without the need for power assistance.

For further comprehension of the invention, and of the objects and advantages thereof, reference will be had to the following description and accompanying drawings and to the appended claims in which the various novel features of the invention are more particularly set forth. In the accompanying drawings forming a material part of this disclosure:

FIGURE 1 is a longitudinal sectional view of a device embodying the invention.

Figure 2:
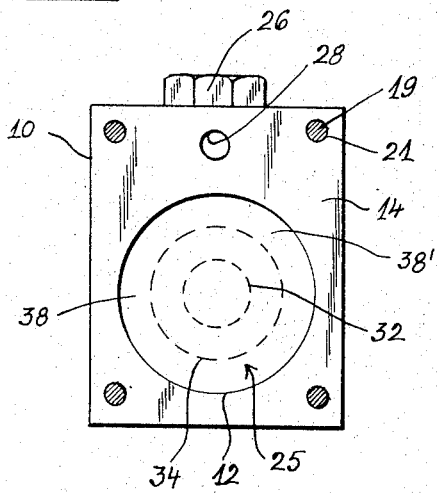
Figure 3:
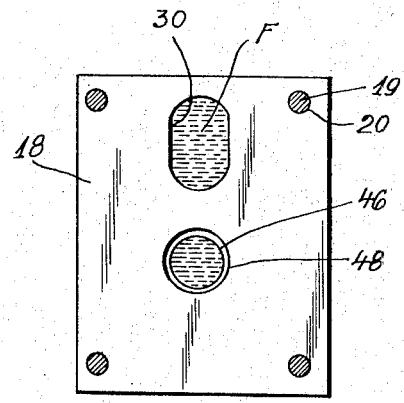

FIGS. 2 and 3 are cross sectional views taken on lines 2—2 and 3—3 respectively of FIG. 1.

Referring to the drawings, the device includes a rectangular block 10 made of suitable material such as steel, bronze or the like. In the block is a larger cylindrical bore or chamber 12 whose axis extends longitudinally of the block from its rear end 14 to a transverse plane P about midway between the front end 16 and the rear end 14 of the block. The block is open at its rear end, and is closed by a removable rectangular cover plate 18 held to the block by screws 19 extending through holes 20 in the plate and seated in threaded holes 21 in the rear end of the block.

A smaller cylindrical bore or chamber 22 extends from the front end of chamber 12 in axial alignment therewith longitudinally of the block to the front end of the block. Chamber 12 communicates with chamber 22 at plane P. A narrow passage 24 extends laterally and radially outwardly of chamber 22 near its rear end. This passage is closed by an external bolt 26 screwed into the threaded outer end of the passage. This bolt can be removed to bleed brake fluid F from the device if necessary. Passage 24 is smaller in cross sectional area than chamber 22. A second passage 28 extends longitudinally of the block between passage 24 and the rear end of the block perpendicularly to passage 24. Passage 28 communicates with a recess 30 formed in the front face of the cover plate 18. Recess 30 has an elongated or oval shape as best shown in FIGS. 1 and 2. The recess communicates at one end with passage 28 and at the other end with the rear end of chamber 12.

In chamber 12 is an axially slidable piston assembly 25. This assembly includes a cylindrical piston rod or plunger 32 extending axially of chamber 12 and disposed in the chamber 22 at its rear end. Plunger 32 serves as a valve to close the connection between passage 24 and chamber 22 on forward movement of the plunger. An annular flange 34 is securely affixed to the rear end of the plunger 32 and extends radially thereof. Flange 34 abuts a cup shaped piston 36 which is backed by a cup washer or facing 38 having a recess 38 facing forwardly at the rear end of chamber 12 and open to recess 30. The piston 36 and facing 38 make fluid tight contact between interior of wall of the chamber 12 to exclude fluid F from the forward air space 40. Fluid F fills passages 24, 28 and chamber 22.

A coiled compression spring 39 around the plunger 32 bears on the front wall 41 of chamber 12 and on the front face of flange 34 to bias the plunger, flange, piston and piston facing rearwardly. The piston facing 38 is thus normally disposed in contact with the front face of cover plate 18 as shown in FIG. 1. The separate component structure of the piston assembly 25 permits smooth movement in chamber 22, simplified construction and precise fluidtight fit.

A lateral breather port 44 is provided in one side of block 10 to connect air space 40 of chamber 12 to the atmosphere and to allow air to pass freely to and from this chamber whenever the piston assembly 25 moves.

A fitting 45 connects fluid line 46 to bore 48 in cover plate 18 so that the fluid line communicates with the rear end of chamber 12. Line 46 terminates at the master brake cylinder (not shown) of hydraulic system actuated by a brake pedal (not shown). Another fluid line 50 is connected by a fitting 52 to the threaded front end of passage 22 to provide communication between this fluid line and chamber 22. Line 50 terminates at wheel brake cylinders (not shown) of the hydraulic brake system in which the device is installed.

The device operates as follows: As the brake pedal of the hydraulic system is depressed, the fluid F is forced out of the master brake cylinder and flows through line 46 into the piston recess 38' at the rear end of chamber 12. Compression spring 39 holds the piston assembly 25 in rearward position as shown in FIG. 1. Thus the fluid F flows through recess 30 and passages 28 and 24 into smaller chamber 22. From there, the fluid flows through line 50 to the wheel brake cylinders. The brakes of the system are engaged by the brake cylinders in conventional manner to effect braking of the vehicle in which the system is installed. Braking up to this point is effected with only the normal and usual amount of brake pedal travel. The booster effect has not yet started.

After the brakes have been set as just described, the fluid pressure in the system continues to build up as a result of pressure applied to the brake pedal. Now, although the fluid pressure per square inch is identical at both ends of the piston assembly 25, the larger area of piston end 36' will have the greater total force applied thereto than that at the smaller area plunger end 32'. Consequently the resistance of spring 39 will be overcome and the entire piston assembly 25 will be forced forward or to the left as viewed in FIG. 1, closing passage 24. Air within the air space 40 of chamber 12 will escape through breather port 44.

As soon as port or passage 24 is closed, the fluid F cannot bypass the piston assembly. The pressure is transmitted directly through the components of piston assembly 25 and booster action is instituted. The resulting fluid pressure in chamber 22 is increased in direct proportion to the ratio of the area of the rear end 36' of piston 36 in chamber 12 to the area of plunger end 32' in chamber 22, or stated otherwise, to the ratio of the cross sectional area of chamber 12 to the cross sectional area of chamber 22. This is the power ratio of the booster device.

Since the brakes already have been set and fluid F is not compressible, there is no further flow of fluid and therefore no additional brake pedal travel. The booster action is now operative. Any further pressure exerted on the brake petal will thus be increased by the booster device in direct proportion to its power ratio.

When the brakes are released by release of the brake pedal, the back pressure in chamber 22 together with the expansion of spring 39 will return the piston assembly to its normal position, shown in FIG. 1. The fluid F will then flow back from line 50 through chamber 22, passages 24 and 28, recess 30, chamber 12 and line 46 to the master cylinder of the hydraulic brake system.

The invention as described thus makes it possible to effect boosting action in a hydraulic brake system with no more than the usual brake pedal travel and with less pedal pressure than is used in conventional hydraulic brake systems. The invention makes it possible to obtain equivalent effects to that obtained with power assisted brakes without the complexity inherent in such systems. The device can be made up in a single size for use as an accessory in braking systems of a large variety of vehicles of different sizes. The device can be of course be made up in different sizes if required. The device can be installed as original equipment in new vehicles or it can be installed as an accessory in existing vehicles. It is simple and durable in construction and requires a minimum of servicing and attention.

While I have illustrated and described a preferred embodiment of my invention in connection a hydraulic brake system of a motor vehicle, it is understood that I do not wish to limit its use or precise construction and that other uses, changes and modificaions may be made within the scope my invention.

What is claimed is:

1. A brake booster, comprising an elongated block, said block having a first larger cylindrical chamber therein extending axially longitudinally of the block between one end thereof and a transverse plane spaced from the other end of the block, said block having a second smaller cylindrical chamber therein extending axially longitudinally of the block in axial alignment with the first chamber between said plane and the other end of the block so that the chambers communicate with each other at said plane, said chambers being open at opposite ends respectively of the block; a piston assembly movably disposed in the first chamber, said assembly comprising a piston movable axially in said first chamber at one end thereof, a plunger extending axially of the first chamber through its other end and movably disposed in said second chamber, and a coil spring in the first chamber biasing said piston and plunger toward said one end of the first chamber and block; a cover plate attached to said one end of the block, said plate having an elongated recess in one side facing said one end of the block, said block having a first passage extending laterally of the second chamber and communicating at one end therewith, said block having a second passage extending longitudinally of the block and communicating at opposite ends with said first passage and said recess; a fluid inlet conduit attached to said plate for passing fluid from a master cylinder of a hydraulic brake system; and a fluid outlet conduit connected to the other end of the block at said second chamber for passing fluid to brake cylinders of said system; whereby when fluid is applied under pressure through said inlet conduit the fluid passes via said one end of the first chamber, said recess, said second and first passages, and said second chamber to said fluid outlet conduit, and whereby said piston assembly moves when continued increased pressure is applied at said master cylinder to advance the plunger for closing off said passages, so that fluid is forced under increased pressure through the second chamber and fluid outlet port to exert a boosting braking effect at the brake cylinders of the system.

2. A brake booster as recited in claim 1, wherein said plunger has a flange at one end contacting said piston, and wherein said piston has a cup-shaped facing defining another recess through which fluid passes between said inlet conduit and recess in said plate.

3. A brake booster as recited in claim 2, wherein the piston, facing and flange are detected from each other to facilitate movement of said assembly and insure a fluidtight fit of the piston and facing at the interior of said first chamber.

4. A brake booster as recited in claim 2, wherein the power boosting effect exerted at the brake cylinders is determined by the ratio in cross sectional area of the first chamber to the cross sectional area of the second chamber, the cross sectional area of the first passage opening into the second chamber being less than the cross sectional area of the second chamber.

5. A brake booster as recited in claim 1, wherein said first passage terminates its other end at one side of said block, and a removable bolt closing said other end of the first passage for bleeding fluid from the block when the bolt is removed.

6. A brake booster as recited in claim 1, wherein an air space is defined in the first chamber between the other end of said first chamber and said piston, said block having a laterally extending breather hole communicating between said air space and the exterior of the block for relieving air pressure in the air space when the piston assembly moves in response to fluid pressure applied to the piston, and to admit air to the air space when the piston assembly moves in response to expansion of said spring and release of fluid pressure on the piston.

7. A brake booster as recited in claim 3, wherein the power boosting effect exerted at the brake cylinders is determined by the ratio in cross sectional area of the first chamber to the cross sectional area of the second chamber, the cross sectional area of the first passage opening into the second chamber being less than the cross sectional area of the second chamber.

8. A brake booster as recited in claim 7, wherein said first passage terminates its other end at one side of said block, and a removable bolt closing said other end of the first passage for bleeding fluid from the block when the bolt is removed.

9. A brake booster as recited in claim 8, wherein an air space is defined in the first chamber between the other end of said first chamber and said piston, said block having a laterally extending breather hole communicating between said air space and the exterior of the block for relieving air pressure in the air space when the piston assembly moves in response to fluid pressure applied to the piston, and to admit air to the air space when the piston assembly moves in response to the expansion of said spring and release of said fluid pressure on the piston.

10. A brake booster as recited in claim 4, wherein an air space is defined in the first chamber between the other end of said first chamber and said piston, said block having a laterally extending breather hole communicating between said air space and the exterior of the block for relieving air pressure in the air space when the piston asembly moves in response to fluid pressure applied to the piston, and to admit air to the air space when the piston assembly moves in response to the expansion of said spring and release of fluid pressure on the piston.

No references cited.

EDGAR W. GEOGHEGAN, *Primary Examiner.*
ROBERT R. BUNEVICH, *Examiner.*